United States Patent
Westbrook

(10) Patent No.: US 9,470,588 B2
(45) Date of Patent: Oct. 18, 2016

(54) OPTICAL SENSOR HAVING FIDUCIARY MARKS DETECTED BY RAYLEIGH SCATTERED LIGHT

(71) Applicant: OFS Fitel, LLC, Norcross, GA (US)

(72) Inventor: Paul S Westbrook, Bridgewater, NJ (US)

(73) Assignee: OFS FITEL, LLC, Norcross, CA (US)

( * ) Notice: Subject to any disclaimer, the term of this patent is extended or adjusted under 35 U.S.C. 154(b) by 320 days.

(21) Appl. No.: 14/201,993

(22) Filed: Mar. 10, 2014

(65) Prior Publication Data

US 2014/0263985 A1    Sep. 18, 2014

Related U.S. Application Data

(60) Provisional application No. 61/786,863, filed on Mar. 15, 2013.

(51) Int. Cl.
*G01L 1/24* (2006.01)
*G01L 1/00* (2006.01)

(52) U.S. Cl.
CPC . *G01L 1/242* (2013.01); *G01L 1/00* (2013.01)

(58) Field of Classification Search
CPC .................................. G01L 1/00; G01L 2/242
See application file for complete search history.

(56) References Cited

U.S. PATENT DOCUMENTS 5,144,125 A * 9/1992 Carter .................... G01K 11/06
                                                                    250/227.15

* cited by examiner

*Primary Examiner* — Francis M Legasse, Jr.
(74) *Attorney, Agent, or Firm* — Lowenstein Sandler LLP

(57) ABSTRACT

An optical fiber having at least one fiduciary mark is provided. The at least one fiduciary mark is located at one or more axial positions along the optical fiber. The at least one fiduciary mark is configured to produce at least one change in a Rayleigh backscattering signal in the optical fiber. The at least one change in a Rayleigh backscattering signal may be an abrupt change in the Rayleigh backscattering signal. The abrupt change in the Rayleigh backscattering signal occurs over a length of the optical fiber that is of the order of or less than a spatial resolution of an interrogation system employed to detect the Rayleigh backscattering signal.

31 Claims, 4 Drawing Sheets

OPTICAL SENSOR HAVING FIDUCIARY MARKS DETECTED BY RAYLEIGH SCATTERED LIGHT

CROSS-REFERENCE TO RELATED APPLICATIONS

This application claims the benefit of U.S. provisional patent application No. 61/786,863 filed Mar. 15, 2013, the disclosure of which is incorporated herein by reference in its entirety.

BACKGROUND OF THE INVENTION

1. Field of the Invention

The invention relates generally to optical fibers. More specifically, the invention relates to an optical sensor that employs Rayleigh backscattering to determine a location in the fiber sensor.

2. Discussion of the Related Art

Optical fibers have been employed in sensing applications, including measurements of distributed strain and temperature in an optical fiber. In one sensing application, an optical signal is transmitted into the optical fiber and perturbations in the fiber core(s) result in back scatter which may be analyzed to obtain the shape of the fiber.

One type of back scattering that has been proposed for use in fiber shape measurements is Rayleigh back scattering. Unfortunately, the spectral and spatial response of Rayleigh back scattering is random. Further, localization of the signal requires precise knowledge of a group index of a fiber. This limits the reliability of Rayleigh back scattering in distributed sensing applications. If there is more than one core in the optical fiber, an additional problem arises. It is necessary to correlate the Rayleigh back scattered signal from the multiple cores in order to obtain an accurate estimate of the fiber shape. However, this also requires accurate knowledge of the group index variation between as well as along the different cores. More particularly, the task of reconstructing the shape requires a measurement of the exact position from backscatter in the fiber. Typically, this will depend on the effective index of a mode propagating in a core of the fiber and, in particular, on the group index of the propagating mode. The group index permits a conversion of temporal and frequency domain information obtained into spatial domain information. However, the effective index and group index will not be the same in all cores of a multicore fiber. Moreover, the effective index and group index will not be the same for both polarizations.

Related art techniques to overcome this problem require accurate calibration of the propagation of light in each core of a multicore fiber. Unfortunately, any drift in waveguide properties can render inaccurate any such calibration. Another related art technique involves the use of fiber gratings to provide the scattering. However, this technique requires the inscription of fiber gratings along the entire length of the fiber. Such fabrication adds cost and complexity to a fiber sensor.

Thus, a need remains in the art to improve measurements of distance along an optical fiber using optical backscatter that does not require continuous fiber gratings or absolute calibration stability.

BRIEF SUMMARY OF THE INVENTION

The above-described problems are addressed and a technical solution is achieved in the art by providing an optical sensor comprising an optical fiber having at least one fiduciary mark. As used herein, a fiduciary mark is an alteration of a physical property at a known location in the optical fiber such that there is an observable change at the known location in a Rayleigh scattering pattern produced in response to a signal/light introduced into the optical fiber at one end. The fiduciary mark may comprise any measurable variation in the Rayleigh backscattering signal and on a length scale comparable to the required length accuracy of the sensing system. In one example, the fiduciary mark may be configured to produce an abrupt change in a Rayleigh backscattering signal in the optical fiber in response to an incoming signal/light. Such marks are operable to change the Rayleigh scattering amplitude and phase in an abrupt manner so that they appear clearly in a spatial trace of a Rayleigh back scattering response. An abrupt change is defined as a change that occurs over a length that is on the order of, or less than, a spatial resolution of an interrogation system used to detect the Rayleigh back scattering response. This abrupt change may have an amplitude that is sufficiently large compared to fluctuations in Rayleigh back scattering response such that it can be distinguished from such fluctuations.

More particularly, the above-described problems are addressed and a technical solution is achieved in the art by providing an optical fiber having at least one fiduciary mark. The at least one fiduciary mark is located at one or more axial positions along the optical fiber. The at least one fiduciary mark is configured to produce at least one change in a Rayleigh backscattering signal in the optical fiber.

The at least one change in a Rayleigh backscattering signal may be an abrupt change in the Rayleigh backscattering signal. The abrupt change in the Rayleigh backscattering signal may occur over a length of the optical fiber that is of the order of or less than a spatial resolution of an interrogation system employed to detect the Rayleigh backscattering signal. In an example, the optical fiber comprises at least two cores.

In another example, the at least one change in the Rayleigh backscattering signal may be equal to or greater than a length measurement accuracy in the optical fiber.

In an example, the at least one fiduciary mark may be located at a known axial position along the optical fiber. The at least one fiduciary mark may correspond to a fiduciary mark located at the same position in two or more cores of a multicore fiber. In an example, the at least one fiduciary mark may be identified as a common fiduciary mark when at least one Rayleigh backscattering signal produced in one core of the two or more cores is substantially cross-correlated with at least one other Rayleigh backscattering signal produced in another core of the two or more cores.

The change in a Rayleigh backscattering signal may be produced by an alteration to propagation properties of the optical fiber over substantially the same distance along the optical fiber. The change in a Rayleigh backscattering signal may be a change in at least one of an intensity, amplitude, polarization dependence, or phase of the backscattering signal. The alteration to propagation properties may be an induced loss or an induced gain in the Rayleigh backscattering signal relative to a background noise signal.

In an example, the at least one fiduciary mark may be produced by exposure of the optical fiber to actinic radiation. In another example, the at least one fiduciary mark may be produced by at least one of a thermal, an electrical, a strain, a poling, or a tapering perturbation of the optical fiber. The fiduciary mark may be produced by splicing two fibers with different Rayleigh scattering properties (e.g., with different Rayleigh scattering strengths). The at least one fiduciary mark may be produced during a draw process of the optical fiber. In an example, the at least one fiduciary mark may be introduced in a core and/or a cladding of the optical fiber.

The at least one fiduciary mark may be configured to produce an aperiodic pattern, a quasi-periodic pattern, or a periodic pattern of altered Rayleigh scattering. Individual parts of the aperiodic pattern, the quasi-periodic pattern, or the periodic pattern of altered Rayleigh scattering may comprise abrupt changes in Rayleigh scattering.

In an example, the at least one fiduciary mark may comprise an aperiodic set, a quasi-periodic set, or a periodic set of fiduciary marks in a plurality of cores when the optical fiber is a multicore fiber, wherein the aperiodic, quasi-periodic, or periodic fiduciary marks are at least one of unequal length, unequal spacing, or operable to produce an unequal change in the Rayleigh backscattering signal. A set of fiduciary marks may be operable to provide identifying information about a region where the at least one fiduciary mark is located. The identifying information about a region where the at least one fiduciary mark is located may identify a code indicating where the at least one fiduciary mark is located.

In another example, the at least one fiduciary mark may comprise an aperiodic set, a quasi-periodic set, or a periodic set of fiduciary marks in a plurality of cores when the optical fiber is a multicore fiber, wherein the aperiodic set, quasi-periodic set, or periodic set of fiduciary marks induces the same pattern in two or more cores of the plurality of cores. In another example, the at least one fiduciary mark may comprise a plurality of aperiodic sets, quasi-periodic sets, or periodic sets of fiduciary marks in a plurality of cores when the optical fiber is a multicore fiber, wherein at least two of the aperiodic sets, quasi-periodic sets, or periodic sets induces the same pattern at the same position in two or more cores of the plurality of cores. The above-described problems are addressed and a technical solution is achieved in the art by providing a method of sensing a location in an optical sensor. A light signal is introduced into an optical fiber comprising at least two cores. Rayleigh backscattering signals located at one or more axial positions in the at least two cores of the optical fiber are measured. At least one change in the measured Rayleigh backscattering signals in the at least two cores of the optical fiber are detected. The measured Rayleigh backscattering signals corresponding to at least one fiduciary mark in the at least two cores of the optical fiber are cross-correlated. The at least one fiduciary mark is identified as a fiduciary mark common to the at least two cores when the measured Rayleigh backscattering signals are substantially correlated.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which.

It is to be understood that the attached drawings are for purposes of illustrating the concepts of the invention and may not be to scale.

DETAILED DESCRIPTION OF THE INVENTION

Figure 1:
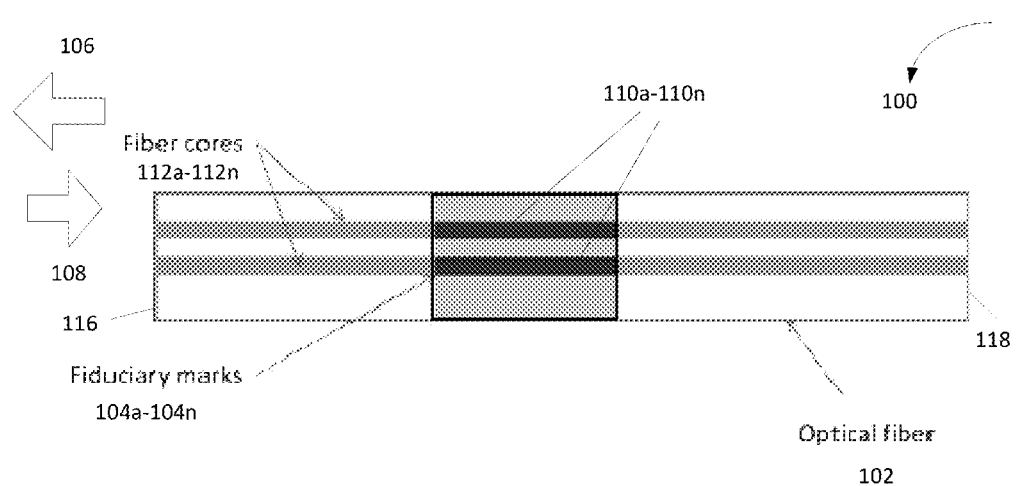
FIG. 1 is a perspective view of one embodiment of an optical sensor.

FIG. 1 is a perspective view of one embodiment of an optical sensor 100. The optical sensor 100 comprises an optical fiber 102 having at least one fiduciary mark 104a-104n. The at least one fiduciary mark 104a-104n is configured to produce an abrupt change in a Rayleigh backscattering signal 106 in the optical fiber 102 in response to an incoming signal/light 108. In one example, the at least one fiduciary mark 104a-104n is operable to change the amplitude and phase of a resulting Rayleigh scattering signal in an abrupt manner that appears clearly in a spatial trace of the Rayleigh back scattering response.

An abrupt change is defined as a change that occurs over a length of the optical fiber 102 that is on the order of, or less than, the spatial resolution of an interrogation system used to detect the Rayleigh back scattering response. This abrupt change may have an amplitude that is sufficiently large compared to fluctuations in a Rayleigh back scattering response signal such that it can be distinguished from such fluctuations. The abrupt change in a Rayleigh backscattering signal may be produced by an alteration to propagation properties of the optical fiber 102 over substantially the same distance along the optical fiber 102. The abrupt change in a Rayleigh backscattering signal may be an abrupt change in at least one of an intensity, amplitude, polarized dependence, or phase of the Rayleigh backscattering signal. The alteration to propagation properties may an induced loss or induced gain in the Rayleigh backscattering signal relative to Rayleigh backscattering signal away from the mark.

In another example, the at least one change in the Rayleigh backscattering signal may be equal to or greater than a length measurement accuracy in the optical sensor 100. Generally, the length measurement accuracy in the optical sensor 100 is the same as (or greater than) the resolution. If it is greater, then fiduciary marks 104a-104n may be made that are greater than the resolution as long as long as the resulting fiduciary marks 104a-104n may be employed to locate positions in the fiber to the required length measurement accuracy.

In one example, a fiduciary mark (e.g., 104a) may be a smooth slow change over a length greater than the system resolution. For instance, if a fiduciary mark (e.g., 104a) is a 1 cm Gaussian shaped bump in the Rayleigh intensity, then it may still be useful if employed in applications where only 1 cm level position accuracy is needed or where the fiber length is very long.

The at least one fiduciary mark 104a-104n may be located at one or more axial positions 110a-110n along the optical fiber 102. In an example, fiduciary marks 104a-104n may be placed in at least two of two or more cores 112a-112n at a common (e.g., the same) known axial position (e.g., 110a).

In another example, the common fiduciary marks 104a-104n may be displaced from each other by a known distance. In another example, the at least one fiduciary mark 104a-104n may be introduced in a cladding of the optical fiber 102.

Figure 2:
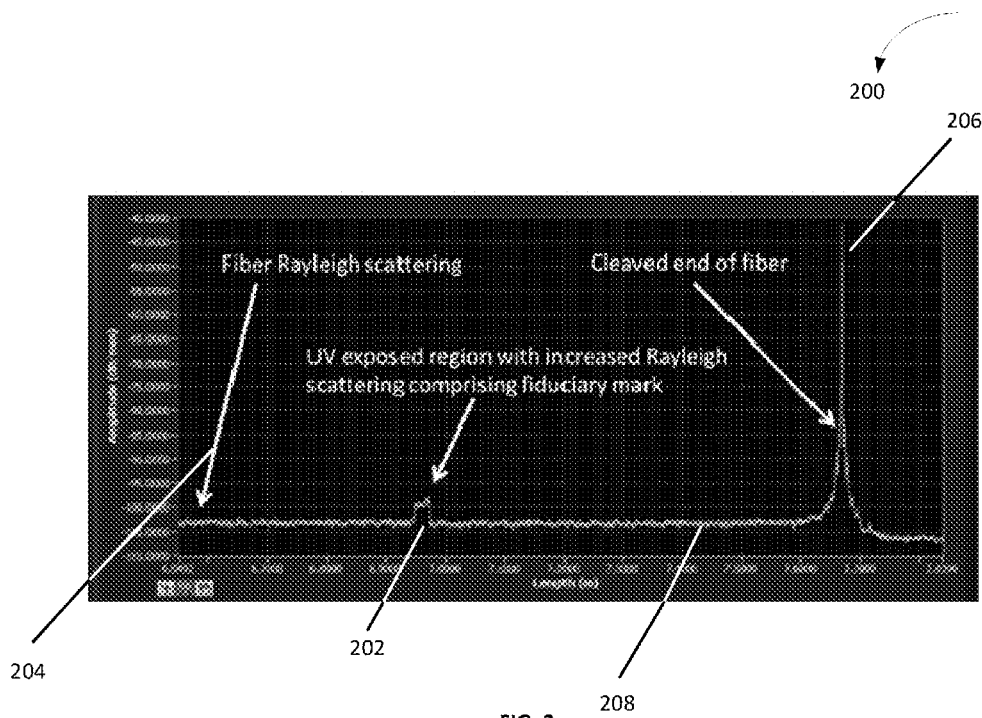
FIG. 2 shows a trace of Rayleigh back scattering signal power measured with a commercial spectral interferometric system.

FIG. 2 shows a trace 200 of Rayleigh back scattering signal power measured with a commercial spectral interferometric system (e.g., LUNA OBR). The y-axis is the Rayleigh back scattered power. The x-axis is position along the optical fiber 102. The back scattering trace 200 shows a change 202 (e.g., produced by a fiduciary mark) induced in a Rayleigh back scattering response signal 204 responsive to a light signal 108 introduced at one end 116 of the optical fiber 102. Note that, in an example, the change 202 is comprised of two changes. One change is an increase in Rayleigh scattering and one change is a decrease in Rayleigh scattering. Thus, the change 202 may be considered two fiduciary marks, or it may be considered as one fiduciary mark with two changes. Also shown is a signal response peak 206 produced at a second end 118 (e.g., a cleaved end 118) of the optical fiber 102. Referring to FIGS. 1 and 2, a measurement of the Rayleigh back scattering response signal 204 intensity may exhibit a change 202 in each of the two of two or more cores 112a-112n.

One method of introducing a fiduciary mark that is operable to induce a change 202 in each of the two of two or more cores 112a-112n in a Rayleigh back scattering response signal 204 is through actinic radiation exposure: for example, UV irradiation of a core of an optical fiber, such as a Ge doped core. To demonstrate this, the optical fiber of FIG. 2 was irradiated by a 2.5 cm beam of 248 nm UV radiation.

When such UV irradiation is used to expose a multicore fiber (e.g., the optical fiber 102), a similar mark may appear in all of the cores 110a-110n of the multicore fiber (e.g., the optical fiber 102). Any subsequent measurement of the Rayleigh back scattering response from more than one core (e.g., 112a, 112b) may exhibit such a mark at a precise axial position along the optical fiber 102 that is common to all cores 112a-112n.

Since the change 202 is known to occur at the same location in each core (e.g., 110a, 110b), the change 202 can be used to precisely overlap spatial information obtained from the two or more cores 112a-112n over an entire length of the optical fiber 102.

In one example, the amplitude of the change 202 in the intensity of the Rayleigh back scattering response signal 204 may be identified as a fiduciary mark if it differs from the background fluctuations 208 of the Rayleigh back scattering response signal 204 by at least 2 dB. In another example, the change 202 may be identified as common fiduciary mark when at least one Rayleigh backscattering signal response produced in one core (e.g. 112a) of two or more cores 112a-112n is substantially cross-correlated with at least one other Rayleigh backscattering signal response produced in another core (e.g. 112b) of the two or more cores. In an example, the calculated cross-correlated amplitude of the Rayleigh back scattering signal intensity may be identified as a fiduciary mark if it differs from the calculated cross-correlated amplitude of the background fluctuations 208 of the Rayleigh back scattering signal response 204 by at least 3 dB.

Thus, a fiduciary mark can be used to spatially correlate information in two or more cores 112a-112n of an optical fiber 102 without the requirement of stable, precisely characterized values of group index along the optical fiber 102 and across different cores of the two or more cores 112a-112n. In an example, the two or more cores 112a-112n of the optical fiber 102 may have different effective indices and/or different group indices. Further, at least one core (e.g., 112a) of the two or more cores 112a-112n of the optical fiber 102 may support more than one mode of propagation.

Analysis of the phase of the Rayleigh back scattering response signal 204 using interferometric techniques may be used to obtain the strain state of the two or more cores 112a-112n of the optical fiber 102 and hence the local state of twist and bend of the optical fiber 102. This information may be integrated to obtain the shape of the optical fiber 102. From the obtained shape, a position of any point along the optical fiber 102 may be obtained; more particularly, a location of the second end 118 of the optical fiber 102 distal to the first end 116 may be obtained, which may contain a probe or actuator that performs a desired task.

UV irradiation is not the only means of introducing such a mark. Other processing methods such as thermal, electrical, strain, poling and tapering are also possible. Use of actinic radiation, air jets or other thermal and mechanical processes during the draw process is also possible. Splicing of differing fibers can also yield such marks in a length of fiber comprising one or more splices.

Figure 3:
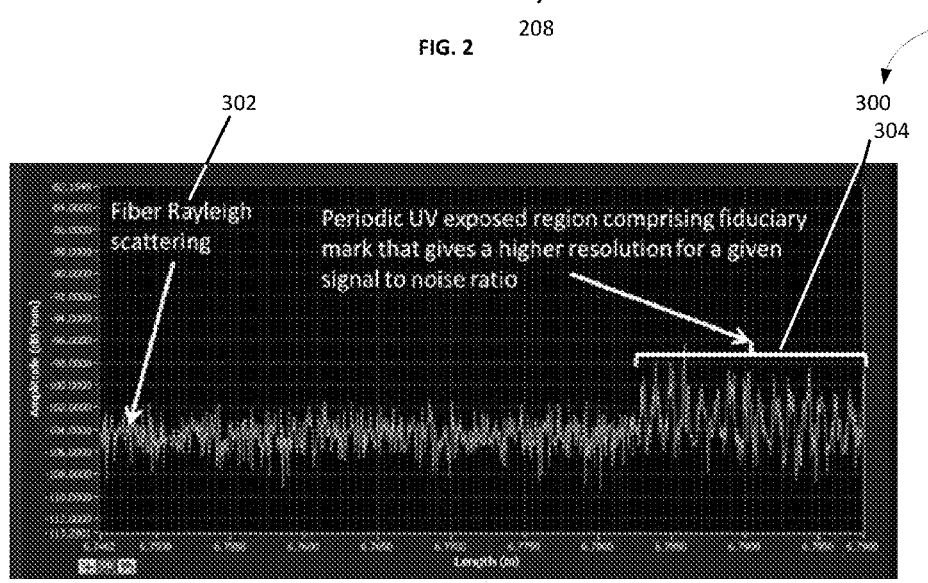
FIG. 3 is a Rayleigh back scattering trace showing a back scattering response induced by a modulated fiduciary mark comprised of many individual exposures to actinic radiation.

FIG. 3 is a Rayleigh back scattering trace 300 showing a back scattering response 302 induced by a modulated fiduciary mark comprised of many individual exposures to actinic radiation. The many individual exposures to actinic radiation may induce a periodic or quasi-periodic pattern of irradiation that results in a corresponding periodic or quasi-periodic pattern 304 in the response 302. In such circumstances, the resulting fiduciary marks may be correlated with higher resolution than would be possible with a single fiduciary mark.

Figure 4:
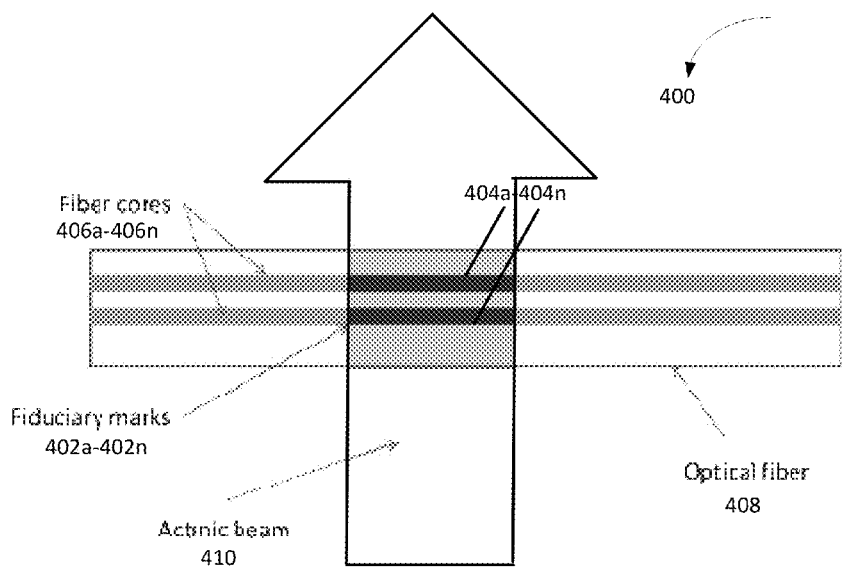
FIG. 4 is a schematic diagram illustrating one method of imprinting fiduciary marks at the same location in two or more cores of a multicore fiber using an actinic radiation beam.

FIG. 4 is a schematic diagram illustrating one method 400 of imprinting fiduciary marks 402a-402n at the same location 404a-404n in two or more cores 406a-406n of a multicore fiber 408 using an actinic radiation beam 410. The two or more cores 406a-406n of a multicore fiber 408 are exposed at a substantially perpendicular angle to the actinic radiation beam 410. The actinic radiation beam 410 may be, but is not limited to, for example, an ultraviolet (UV) 248 nm radiation beam, an infrared (IR) femtosecond radiation beam, or a CO2 laser beam.

Figure 5:
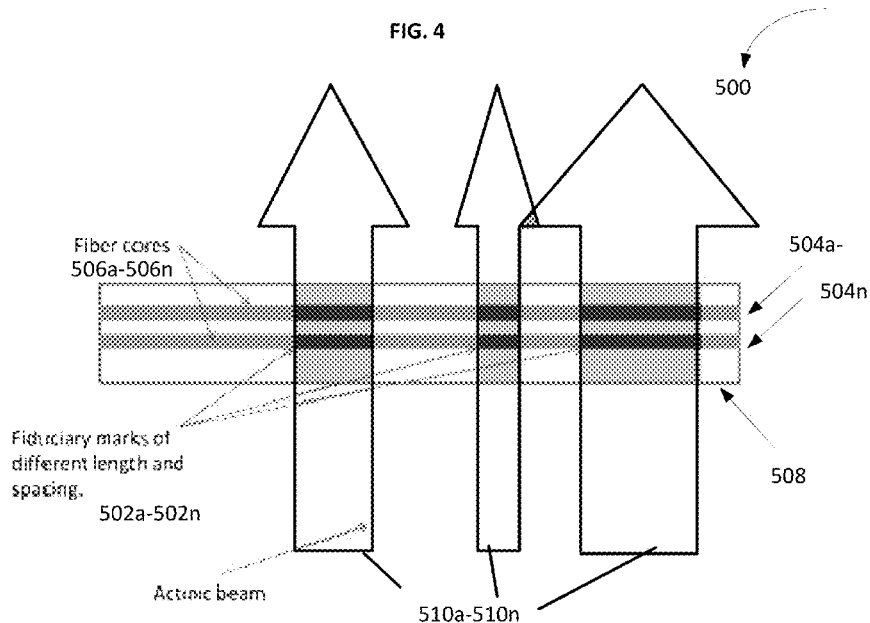
FIG. 5 is a schematic diagram illustrating one method of imprinting fiduciary marks at the same location in two or more cores of a multicore fiber using a plurality of actinic radiation beams; and, FIG. 6 is a process flow detailing a method of sensing a location in an optical sensor.

FIG. 5 is a schematic diagram illustrating one method 500 of imprinting fiduciary marks 502a-502n at the same location 504a-504n in two or more cores 506a-506n of a multicore fiber 508 using a plurality of actinic radiation beams 510a-510n. In an example, the two or more cores 506a-506n of a multicore fiber 508 are exposed at a substantially perpendicular angle to the plurality of actinic radiation beams 510a-510n. The plurality of actinic radiation beams 510a-510n may be equally spaced to induce a periodic set of fiduciary marks. In another example, the plurality of actinic radiation beams 510a-510n may be unequally spaced, may be of unequal length, or may be of unequal intensity to induce an aperiodic set, a quasi-periodic set, or a periodic set of fiduciary marks 502a-502n at the same location 504a-504n in the two or more cores 506a-506n of the multicore fiber 508. The resulting induced set of fiduciary marks 502a-502n may induce a corresponding unequal spacing, unequal length, or unequal in magnitude/phase of changes in a Rayleigh back scattering response to an incoming light, respectively. In another example, the resulting induced set of fiduciary marks 502a-502n may comprise an aperiodic set, a quasi-periodic set, or a periodic set of fiduciary marks in a plurality of the cores 506a-506n when the optical fiber 102 is a multicore fiber 508, where the aperiodic set, quasi-periodic set, or periodic set of fiduciary marks 502a-502n induces the same pattern in two or more cores of the plurality of cores 506a-506n. In another example, the resulting induced set of fiduciary marks 502a-502n may comprise a plurality of aperiodic sets, quasi-periodic sets, or periodic sets of fiduciary marks 502a-502n in a plurality of cores 506a-506n when the optical fiber 102 is a multicore fiber 508, where at least two aperiodic sets, quasi-periodic sets, or periodic sets of fiduciary marks 502a-502n induces the same pattern at the same position in two or more cores of the plurality of cores 506a-506n.

In another example, a set of fiduciary marks 502a-502n may be configured to provide a code indicating where the set of fiduciary marks 502a-502n is located or some other identifying information about the region where the set of fiduciary marks 502a-502n is located. For instance, the set of fiduciary marks 502a-502n may represent digits of a number.

Figure 6:
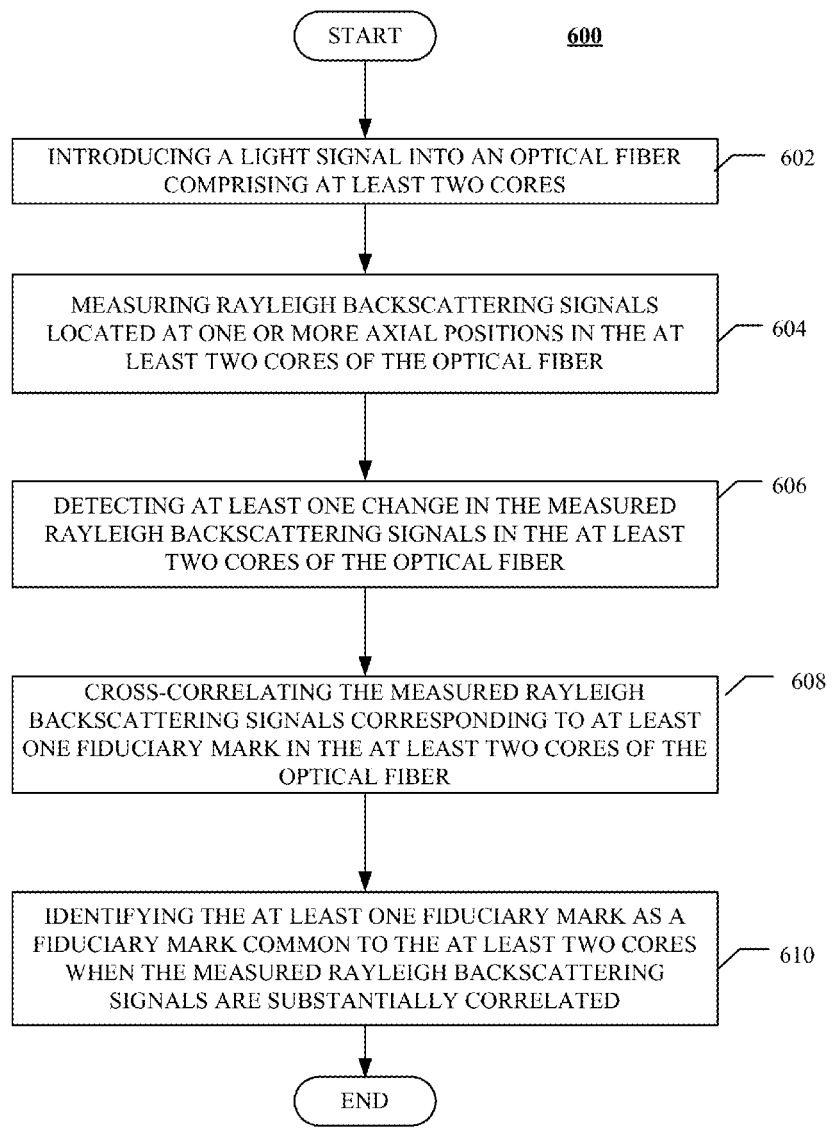

FIG. 6 is a process flow detailing a method of sensing a location in an optical sensor 100. Referring to FIGS. 1, 2 and 6, at block 602, a source of light 108 is introduced into an optical fiber 102 comprising at least two cores 112a-112n. At block 604, Rayleigh backscattering signals 106 located at one or more axial positions 110a-110n in the at least two cores 112a-112n of the optical fiber 102 are measured. At block 606, at least one change 202 in the measured Rayleigh backscattering signals 106 in the at least two cores 112a-112n of the optical fiber 102 are detected. At block 608, the measured Rayleigh backscattering signals 106 corresponding to at least one fiduciary mark (e.g., 104a) in the at least two cores 112a-112n of the optical fiber 102 are cross-correlated. At block 610, the at least one fiduciary mark (e.g., 104a) is identified as a fiduciary mark common to the at least two cores 112a-112n when the measured Rayleigh backscattering signals 106 are substantially correlated.

In an example, the at least one change 202 may be an abrupt change in the measured Rayleigh backscattering signals 106. In an example, the optical fiber 102 may have more than one core (e.g., 112a-112n) and the at least one fiduciary mark (e.g., 104a) may be marks at the same position in each core. In an example, the method may further comprise providing identifying information about a region where the at least one fiduciary mark (e.g., 104a) is located. The identifying information about a region where the at least one fiduciary mark (e.g., 104a) is located may identify a code indicating where the at least one fiduciary mark (e.g., 104a) is located.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A multicore optical fiber having at least one fiduciary mark, the at least one fiduciary mark located at one or more axial positions along the optical fiber, the at least one fiduciary mark configured to produce at least one change in a Rayleigh backscattering signal in the optical fiber, the at least one fiduciary mark corresponding to a fiduciary mark located at the same position in two or more cores of the multicore optical fiber.

2. The optical fiber of claim 1, wherein the at least one change is an abrupt change in the Rayleigh backscattering signal.

3. The optical fiber of claim 1, wherein the at least one change in the Rayleigh backscattering signal occurs over a length of the optical fiber that is of the order of or less than a spatial resolution of an interrogation system employed to detect the Rayleigh backscattering signal.

4. The optical fiber of claim 1, wherein the at least one change in the Rayleigh backscattering signal occurs over a length of the optical fiber that is of the order of or less than a length measurement accuracy in the optical fiber.

5. The optical fiber of claim 1, wherein the optical fiber comprises at least two cores.

6. The optical fiber of claim 1, wherein the at least one fiduciary mark is located at a known axial position along the optical fiber.

7. The optical fiber of claim 1, wherein the at least one fiduciary mark is identified as a common fiduciary mark when at least one Rayleigh backscattering signal produced in one core of the two or more cores shows substantial cross-correlation with at least one other Rayleigh backscattering signal produced in another core of the two or more cores.

8. The optical fiber of claim 1, wherein the at least one change in a Rayleigh backscattering signal is produced by an alteration to propagation properties of the optical fiber over substantially the same distance along the optical fiber.

9. The optical fiber of claim 1, wherein the at least one change in a Rayleigh backscattering signal is a change in at least one of an intensity, amplitude, polarization dependence, or phase of the backscattering signal.

10. The optical fiber of claim 1, wherein the alteration to propagation properties is an induced loss in the Rayleigh backscattering signal relative to a background noise signal.

11. The optical fiber of claim 1, wherein the alteration to propagation properties is an induced gain in the Rayleigh backscattering signal relative to a background noise signal.

12. The optical fiber of claim 1, wherein the at least one fiduciary mark is produced by exposure to actinic radiation.

13. The optical fiber of claim 1, wherein the at least one fiduciary mark is produced by at least one of a thermal, an electrical, a strain, a poling, or a tapering perturbation of the optical fiber.

14. The optical fiber of claim 1, wherein the at least one fiduciary mark the mark is made by splicing two or more fibers with different Rayleigh scattering strengths.

15. The optical fiber of claim 1, wherein the at least one fiduciary mark is produced during a draw process of the optical fiber.

16. The optical fiber of claim 1, wherein the at least one fiduciary mark is introduced in a core of the optical fiber.

17. The optical fiber of claim 1, wherein the at least one fiduciary mark is introduced in a cladding of the optical fiber.

18. The optical fiber of claim 1, wherein the at least one fiduciary mark is configured to produce an aperiodic pattern, a quasi-periodic pattern, or a periodic pattern of altered Rayleigh scattering.

19. The optical fiber of claim 1, wherein the at least one fiduciary mark comprises an aperiodic set, a quasi-periodic set, or a periodic set of fiduciary marks in a plurality of cores when the optical fiber is a multicore fiber, wherein the aperiodic set, the quasi-periodic set, or the periodic set of fiduciary marks are at least one of unequal length, unequal spacing, or operable to produce an unequal change in the Rayleigh backscattering signal.

20. The optical fiber of claim 1, wherein the at least one fiduciary mark comprises a set of fiduciary marks in a plurality of cores when the optical fiber is a multicore fiber, wherein the set of fiduciary marks induces the same pattern in two or more cores of the plurality of cores.

21. The optical fiber of claim 1, wherein the at least one fiduciary mark comprises a plurality of sets of fiduciary marks in a plurality of cores when the optical fiber is a multicore fiber, wherein each set of the plurality of sets induces the same pattern at the same position in two or more cores of the plurality of cores.

22. The optical fiber of claim 1, wherein two or more cores of the plurality of cores have at least one of different effective indices or different group indices.

23. The optical fiber of claim 1, wherein at least one core of the plurality of cores support more than one mode of propagation.

24. The optical fiber of claim 18, wherein individual parts of the aperiodic pattern, the quasi-periodic pattern, or the periodic pattern of altered Rayleigh scattering comprise abrupt changes in Rayleigh scattering.

25. The optical fiber of claim 19, wherein the aperiodic set, the quasi-periodic set, or the periodic set of fiduciary marks are operable to provide identifying information about a region where the at least one fiduciary mark is located.

26. The optical fiber of claim 25, wherein the identifying information about a region where the at least one fiduciary mark is located identifies a code indicating where the at least one fiduciary mark is located.

27. A method of sensing a location in an optical fiber, comprising:
   introducing a light signal into an optical fiber comprising at least two cores;
   measuring Rayleigh backscattering signals located at one or more axial positions in the at least two cores of the optical fiber;
   detecting at least one change in the measured Rayleigh backscattering signals in the at least two cores of the optical fiber;
   cross-correlating the measured Rayleigh backscattering signals corresponding to at least one fiduciary mark in the at least two cores of the optical fiber; and
   identifying the at least one fiduciary mark as a fiduciary mark common to the at least two cores when the measured Rayleigh backscattering signals are substantially correlated.

28. The method of claim 27, wherein the at least one change is an abrupt change in the measured Rayleigh backscattering signals.

29. The method of claim 27, wherein the optical fiber has more than one core and the at least one fiduciary mark are marks at the same position in each core.

30. The method of claim 27, further comprising providing identifying information about a region where the at least one fiduciary mark is located.

31. The method of claim 27, wherein the identifying information about a region where the at least one fiduciary mark is located identifies a code indicating where the at least one fiduciary mark is located.

* * * * *